US007463971B2

(12) United States Patent
Holcomb et al.

(10) Patent No.: US 7,463,971 B2
(45) Date of Patent: Dec. 9, 2008

(54) WIRELESS DATA COLLECTION UNIT FOR FUEL MANAGEMENT SYSTEM

(75) Inventors: Dirk Holcomb, Flowery Branch, GA (US); Keith Coggins, Norcross, GA (US); Steven Jackson, Norcross, GA (US)

(73) Assignee: Varec, Inc., Norcross, GA (US)

( * ) Notice: Subject to any disclaimer, the term of this patent is extended or adjusted under 35 U.S.C. 154(b) by 717 days.

(21) Appl. No.: 11/039,050

(22) Filed: Jan. 20, 2005

(65) Prior Publication Data

US 2005/0267672 A1 Dec. 1, 2005

Related U.S. Application Data

(60) Provisional application No. 60/537,677, filed on Jan. 20, 2004.

(51) Int. Cl.
*G06F 19/00* (2006.01)

(52) U.S. Cl. ............................ 701/123; 701/3; 340/450

(58) Field of Classification Search ..................... 701/3, 701/123; 705/1, 21, 413; 340/450, 450.2, 340/945

See application file for complete search history.

(56) References Cited

U.S. PATENT DOCUMENTS

| | | | | |
|---|---|---|---|---|
| 4,408,204 | A | 10/1983 | Salvesen | 340/870.24 |
| 4,788,648 | A | 11/1988 | Ferretti et al. | 702/55 |
| 4,819,183 | A | 4/1989 | O'Brien et al. | 700/282 |
| 4,850,223 | A | 7/1989 | Carlin et al. | 73/49.2 |
| 5,056,017 | A | 10/1991 | McGarvey | 705/28 |
| 5,065,013 | A | 11/1991 | Taylor | 250/231.18 |
| 5,103,225 | A | 4/1992 | Dolan et al. | 341/13 |
| 5,204,819 | A | 4/1993 | Ryan | 705/413 |
| 5,297,423 | A | 3/1994 | Keating et al. | 73/49.2 |
| 5,400,253 | A | 3/1995 | O'Connor | 701/123 |
| 5,487,300 | A | 1/1996 | Brackett et al. | 73/61.59 |
| 5,579,233 | A | 11/1996 | Burns | 700/240 |
| RE35,793 | E | 5/1998 | Halpern | 702/62 |
| 5,859,416 | A | 1/1999 | Gatto | 235/384 |
| 6,119,058 | A | 9/2000 | Anderberg | |
| 6,370,488 | B1 | 4/2002 | Beaudoin et al. | |
| 6,370,515 | B1 | 4/2002 | Diamond et al. | |
| 6,463,389 | B1 | 10/2002 | Dickson | 702/35 |

(Continued)

FOREIGN PATENT DOCUMENTS

| | | |
|---|---|---|
| JP | 11073353 | 3/1999 |

OTHER PUBLICATIONS www.controlink.com, Explosion Proof Antenna Fitting Product Specification, Jan. 13, 2005, 4-pgs.

(Continued)

*Primary Examiner*—Gertrude Arthur Jeanglaud
(74) *Attorney, Agent, or Firm*—King & Spalding LLP

(57) ABSTRACT

An electronic fueling data acquisition and wireless communications delivery system. The unit is mounted on Aircraft Fueling Vehicles and Aircraft Fuel Servicing Hydrant Vehicles (Hydrant Vehicles) and is hardwired to an external pulse transmitter. The pulse transmitter transmits pulse signals proportional to the volume of fuel that is being pumped. A software configurable hardware filter attenuates the input signal which is then counted by a pulse accumulator. When fueling ceases, the application software can convert the pulse signal values to an equivalent volumetric total. The information can then be wirelessly communicated to other devices without the need for maintaining paper hard copies.

20 Claims, 6 Drawing Sheets

U.S. PATENT DOCUMENTS

| | | | | |
|---|---|---|---|---|
| 6,481,627 | B1 | 11/2002 | Guerreri | |
| 6,523,744 | B2 | 2/2003 | Royal, Jr. et al. | |
| 6,546,314 | B1 | 4/2003 | Carr et al. | 700/244 |
| 6,681,362 | B1 | 1/2004 | Abbott et al. | |
| 6,708,562 | B2 | 3/2004 | Kruger et al. | 73/314 |
| 6,935,356 | B2 | 8/2005 | Shepard et al. | 137/1 |
| 6,975,964 | B2 | 12/2005 | Reichler et al. | 702/182 |
| 2002/0009993 | A1 | 1/2002 | Dastrup et al. | |
| 2002/0116299 | A1 | 8/2002 | Diamond et al. | |
| 2003/0109973 | A1 | 6/2003 | Hensey et al. | |
| 2003/0191566 | A1 | 10/2003 | Ben-Assa | |
| 2003/0195676 | A1 | 10/2003 | Kelly et al. | 701/29 |
| 2005/0090969 | A1 | 4/2005 | Siok et al. | |
| 2005/0107897 | A1 | 5/2005 | Callaghan | 700/87 |
| 2005/0216139 | A1 | 9/2005 | Laughlin et al. | |
| 2005/0246275 | A1 | 11/2005 | Nelson | |

OTHER PUBLICATIONS

International Search Report and Written Opinion for Application No. PCT/US05/01802, dated Jan. 5, 2007 (mailing date).

PSM, "Tankview User's Guide," MAN019 Issue C, Jan. 2001, 16 pp.

WIRELESS DATA COLLECTION UNIT FOR FUEL MANAGEMENT SYSTEM

RELATED APPLICATION

The present application claims priority under 35 U.S.C. § 119(e) to a corresponding provisional patent application, U.S. Provisional Patent Application Ser. No. 60/537,677, filed on Jan. 20, 2004. This provisional patent application is hereby fully incorporated herein by reference.

FIELD OF THE INVENTION

The invention relates to a system for acquiring data during the fueling operations of an aircraft. More particularly described, the invention relates to an electronic fueling data acquisition and wireless communications delivery system.

BACKGROUND OF THE INVENTION

In the conventional art, fueling transactions for airplanes are usually a manually intense process relying on paper-based systems. Existing systems are typically mechanical meters mounted on Aircraft Fueling Vehicles and Aircraft Fuel Servicing Hydrant Vehicles (Hydrant Vehicles) that provide fuel to airplanes. In a typical fueling transaction, a fueling service agent uses paper receipts to manually stamp a current fuel total before and after fueling an airplane. Copies of this paper information are then hand carried to the pilot of the aircraft and to fuel accountants who manually calculate the total volume of fuel pumped into the aircraft. Eventually, fuel accountants will manually key in the day's fuel information into their accounting system databases.

Although the conventional systems have been in use for a number of years, they have certain limitations. For example, the act of manually stamping paper tickets and passing hard copies to a number of different individuals is a time consuming and inefficient process. Furthermore, lost tickets are also a common problem with the conventional systems.

In view of the foregoing, there is a need in the art for a fueling data acquisition solution that overcomes the limitations of current systems. Particularly, a need exists in the art for an electronic fueling data acquisition system that can wirelessly communicate with other devices to distribute the necessary fuel information without the need for physical paper tickets. Furthermore, a need exists for a low power electronic fueling data acquisition system that does not need site power to operate.

SUMMARY OF THE INVENTION

The invention meets the needs described above by providing a paperless solution to conventional fueling transaction systems. According to one exemplary aspect, a wireless data collection unit is provided that can convert pulse signals received from a conventional pulse transmitter into volumetric totals. The pulse signals represent an equivalent volume of fuel for the aircraft during fueling operations. The wireless data collection unit can comprise software configurable hardware filters that can eliminate noise from the signals originating from the pulse transmitter. The wireless data collection unit can comprise an RF module for modulating the volume values onto RF signals and for sending these signals to another device. The wireless data collection unit can also comprise an explosion-proof housing that contains the configurable hardware filters and RF module and that is coupled to an RF antenna.

In a representative fueling environment, the invention can be mounted on Aircraft Fueling Vehicles and Aircraft Fuel Servicing Hydrant Vehicles (Hydrant Vehicles) and hardwired to an external pulse transmitter. The system can comprise two software configurable hardware filters, each capable of receiving a separate input signal from a pulse transmitter. Each software configurable hardware filter can transmit a signal into two separate pulse accumulators that can increment a pulse accumulator for each input pulse signal. The value of the pulse accumulator can be read by a timer/counter register on a micro-controller which can store that information in a nonvolatile memory along with other information such as program variables, configuration items, and transaction information. The micro-controller may contain a serial interface and expansion port. The serial interface can be used to make hardwire connections to other devices, while the expansion port can be used to connect to a wireless RF module that can transmit information wirelessly through an antenna. The micro-controller can also contain a low frequency oscillator and a power out which can be used to transmit power to an external pulse transmitter. A rechargeable battery can be used to power the invention, and a voltage and current monitor may be used to observe the input voltage and current and can alert an operator if the battery is deficient. Furthermore, there can also be a discontinuous voltage regulator to efficiently convert power from the input power line.

For one aspect of the invention a method is provided for receiving and counting input pulse signals based on the amount of fuel that is pumped into a container, such as a fuel tank of an aircraft. When no pulse signals are detected by the invention, the unit can operate in a low power sleep mode. When the unit receives a request from an operator to start data collection, the initial pulse value can be determined and transmitted to an external device. As the operator begins fueling, pulse signals can be received from an external pulse transmitter. The input signals can be filtered by a software configurable hardware filter. In turn, a pulse accumulator can increment a timer/counter register for each pulse signal received. After the operator stops fueling, the final pulse value can be determined. The processor can then convert the pulse value to an equivalent volumetric total and transmit that value to an external device. Finally, the unit can return to a low power sleep mode when no more pulse signals are received.

In another aspect of the invention, communication between the operator and unit can be done wirelessly. Therefore, the unit can continuously send volumetric fuel information to an operator throughout the fueling process. Furthermore, when fueling is completed, the information can be communicated wirelessly to other individuals, such as the pilots, without the need for a paper copy.

In yet another aspect of the invention, an antenna can be coupled into an explosive proof housing. This type of coupling can be advantageous to allow the invention to communicate wirelessly with other devices and allow the system to operate safely in a hazardous environment without causing the ignition of fuel.

These and other aspects, objects, and features of the invention will become apparent from the following detailed description of the exemplary embodiments, read in conjunction with, and reference to, the accompanying drawings.

DETAILED DESCRIPTION OF EXEMPLARY EMBODIMENTS

The invention provides for a wireless data collection unit and wireless communication system that provides a paperless solution to conventional fueling transaction systems.

According to one exemplary embodiment, a wireless data collection unit can be mounted on Aircraft Fueling Vehicles and Aircraft Fuel Servicing Hydrant Vehicles (Hydrant Vehicles) and hardwired to an external pulse transmitter that produces pulse signals corresponding to the amount of fuel being pumped into an aircraft. The input pulse signals are typically attenuated by a software configurable hardware filter and then routed to a pulse accumulator that can increment a timer/counter register for each input pulse signal. The value of the timer/counter register can be read by a micro-controller and stored in nonvolatile memory.

Communication with the micro-controller may be done through a hardwire connection to a serial interface or through an expansion port that can be used to connect to a wireless RF module that can transmit information wirelessly through an antenna. The micro-controller can also contain a low frequency oscillator and a power out which can be used to provide power to an external pulse transmitter. A rechargeable battery can be used to power this embodiment, and a voltage and current monitor may be used to observe the input voltage and current and can alert an operator if the battery is deficient. Furthermore, there can also be a discontinuous voltage regulator on the input power line.

An exemplary wireless data collection unit can receive and count input pulse signals based on the amount of fuel that is pumped into a container, such as a fuel tank of an aircraft. When not in use the wireless data collection unit can operate in a low power sleep mode. However, when the unit receives a request from an operator to start data collection, an initial pulse value is determined and subsequent pulse signals produced by an external pulse transmitter are filtered and then counted by a pulse accumulator. When fueling ceases, a final pulse value can be determined and then converted into a volumetric fuel value. The information then can be communicated wirelessly between the unit and an operator using a wireless handheld device.

Figure 1:
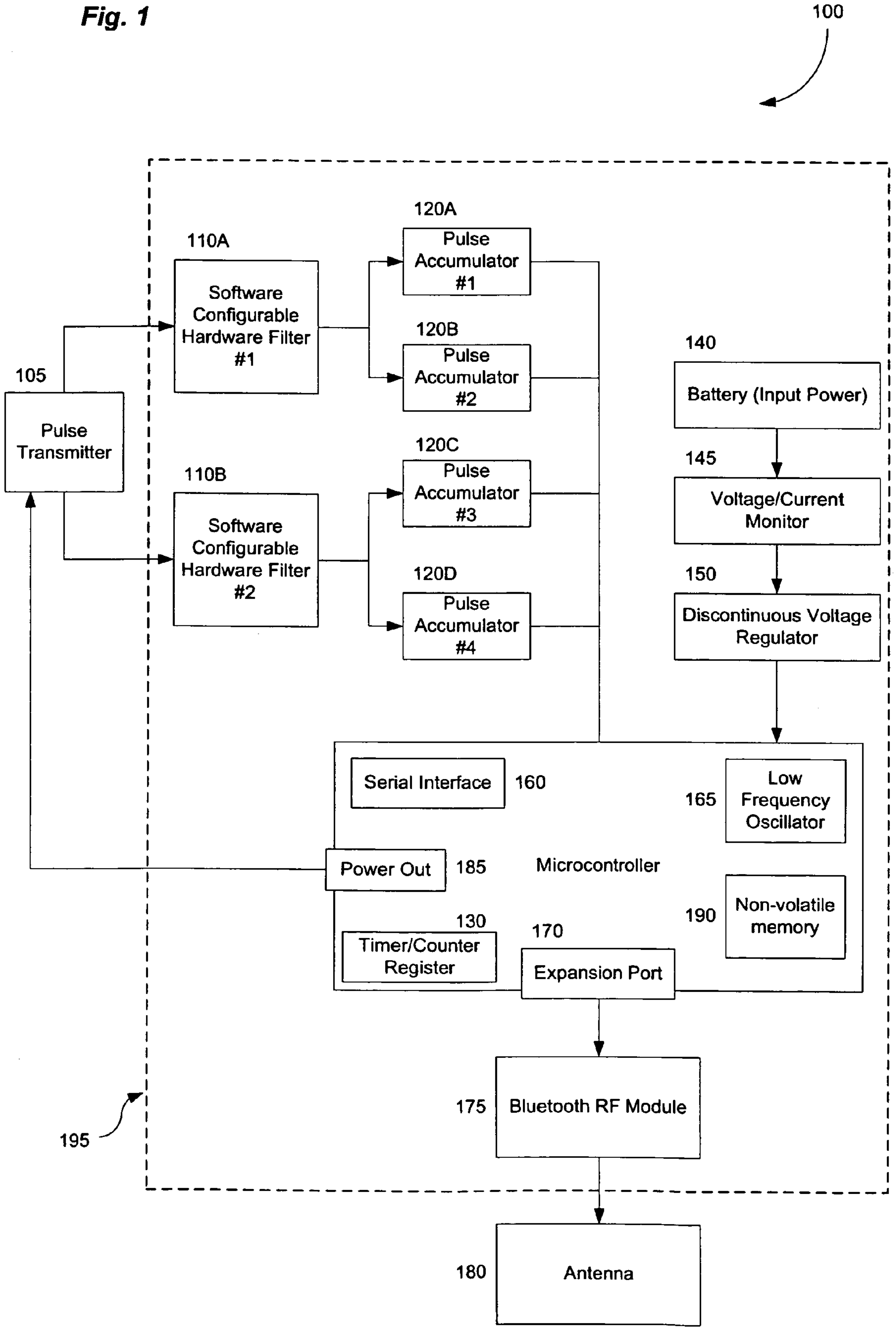
FIG. 1 is a block diagram illustrating the system diagram of the electronic fueling data acquisition and wireless communication system in accordance with an exemplary embodiment of the invention.

Referring now to the drawings, in which like numerals represent like elements, aspects of the exemplary embodiments will be described in connection with the drawing set. FIG. 1 is a block diagram illustrating a system 100 comprising an electronic fueling data acquisition and wireless communication system constructed in accordance with an exemplary embodiment of the invention. The exemplary system 100 is typically enclosed is an explosion-proof enclosure 195. Therefore, even if fuel vapors are able to penetrate the enclosure 195, the enclosure 195 would be able to stay intact and dissipate the energy of the ignition. An external pulse transmitter 105 usually found mounted on a fuel cart transmits pulse signals into one of two software configurable hardware filters 110A, 110B. The pulse transmitter 105 functions as a meter and generates pulse signals based on the quantity of fuel pumped into an aircraft. Each pulse transmitter 105 is rated at a certain meter factor; whereby, for example, one gallon of fuel is equal to ten pulses. The system 100 provides for two separate pulse channels that feed into the two software configurable hardware filters 110A, 110B.

Each of these channels can be used independently to transmit pulse signals from two different fuel sources or they can work simultaneously with one fuel source to provide for redundant fuel readings. When the software configurable hardware filters 110A, 110B receive a pulse signal, the filters 110A, 110B operate to shape and define the width of the input pulse signal so it will easily be read by the pulse accumulators 120A, 120B, 120C, 120D. The filters 110A, 110B detect a pulse signal generated by the pulse transmitter and each allows for a certain period of time, defined in the application software, to ignore other signals across the line. Each filter 110A, 110B then transmits the signal to its respective pair of pulse accumulators 120A, 120B, 120C, 120D.

The software configurable hardware filters 110A, 110B can eliminate the possibility of extra noise coming across the pulse channels, thereby preventing a noise-related miscount by the pulse accumulators 120A, 120B, 120C, 120D. The pulse accumulators 120A, 120B, 120C, 120D can comprise a timer/counter register 130 that maintains a running count of the pulse signals it receives. Each software configurable hardware filter 110A can feed into two pulse accumulators 120A, 120B while another software configurable hardware filter 110B can feed into two different pulse accumulators 120C, 120D.

Having two pulse accumulators per channel provides redundancy where each accumulator 120 on the pulse channel may be compared to see if they have the same accumulation value. Information from the accumulators 120 is acquired from the timer/counter register 130 by the micro-controller 155 and stored in a nonvolatile memory 190, such as random access memory. The memory 190 is used for storing program variables, transaction information, and configuration items including the meter factor that represents the amount of fuel equivalent to each pulse signal received and a unique identifier for each system 100.

The application software of the micro-controller 155 continuously converts the input pulse signal value into a volumetric value by applying the meter factor to the total number of input pulse signals. The volumetric value information may be communicated to other devices in different ways. For connecting to other devices, the micro-controller 155 can comprise a serial interface 160 that may be hardwired to other devices. Furthermore, the serial interface 160 may be used for diagnostic and configuration of the micro-controller 155. The micro-controller 155 also has an expansion port 170 that connects to the Bluetooth RF module 175 that wirelessly transmits information to other devices, such as the Intoplane Client Handheld Computer, through an external antenna 180.

An important feature of the system 100 is its ability to operate in a low power sleep mode when no pulse signals or communication data are being transmitted. This feature is necessary in some exemplary embodiments. Aircraft Fuel Servicing Hydrant Vehicles (Hydrant Vehicles) where the system 100 is located in some exemplary embodiments are typically mobile and do not have site power available to them. The system 100 can enter into a low power sleep mode after a certain period of time, usually thirty minutes, that is configurable by the application software.

The system 100 can be powered by a rechargeable battery 140 with an input voltage range of 8 to 36 VDC. A 12 Volt, 40 Amp hour battery 140 included in the system 100 with a power out 185 controlling power to the pulse transmitter can operate the device in excess of 90 days without replacement or re-charging. However, other power sources, such as a combination of solar cells and batteries, and other similar power sources are not beyond the scope of the invention.

The input voltage and current are monitored by circuits 145 that measure the power consumption of the device and have the capability of alerting an operator that the system needs a new battery 140. Furthermore, in keeping with the requirement of a low power environment, this low power alert feature may be de-activated to reduce the system power consumption. The system 100 can also comprise a discontinuous voltage regulator 150 that provides high efficiency regulation, especially in low current loads while the microcontroller 155 is in sleep mode. To further reduce power consumption, a power output 185 may be supplied by the micro-controller 155 directly to the pulse transmitter 105 instead of the transmitter 105 being powered by a battery. This allows the application software of the micro-controller 155 to discontinue supplying power to the pulse transmitter 105 in a low power mode.

In order to monitor the system 100 while in low power sleep mode, the micro-controller 155 can comprise a low frequency oscillator 165. The purpose of the low frequency oscillator 165 is to transmit a signal to the micro-controller 155 once every thirty seconds to force the micro-controller 155 out of the low power sleep mode so the application software can perform hardware monitoring functions to determine if all the hardware is functioning properly. If the hardware is functioning properly, the micro-controller 155 will re-enter the low power sleep mode; however, if it is not functioning properly, the application software can perform a series of recovery processes.

Figure 2:
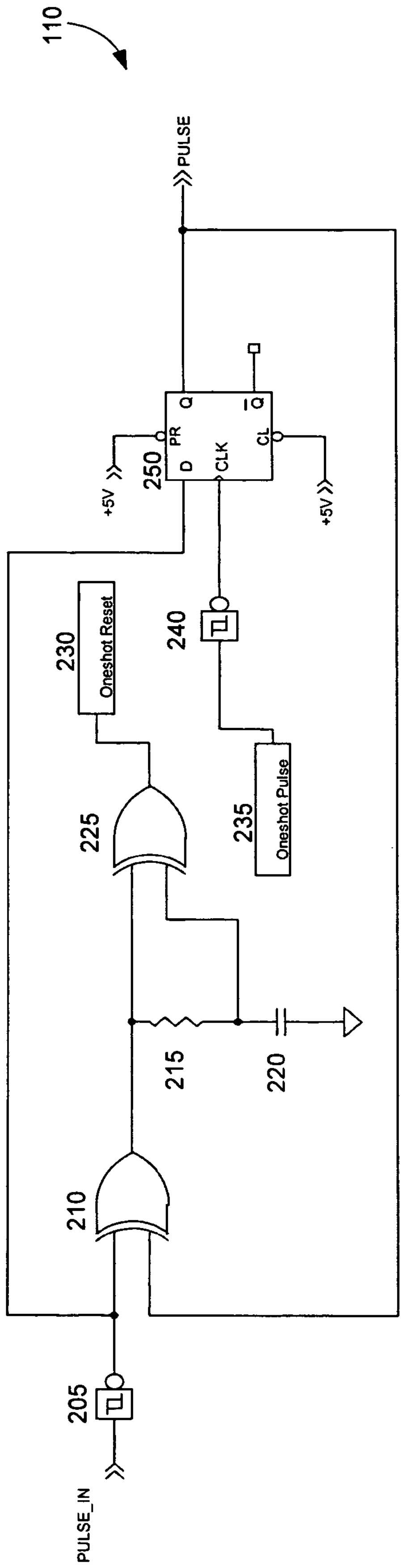
FIG. 2 is an electrical circuit diagram of a software configurable hardware filter in accordance with an exemplary embodiment of the invention.

Referring now to FIG. 2, this drawing is an electrical circuit diagram of a software configurable hardware filter 110 constructed in accordance with an exemplary embodiment of the invention. The purpose of this filter 110 is to provide additional input frequency band filtering by attenuating higher frequency noise on the pulse channel, which is especially useful for removing extra noise from the input pulse signals caused by the vibration of contacts in mechanical switches. The software configurable hardware filter 110 has advantages over strictly hardware filters because it is controlled through software. This configuration easy, but once it is configured the filter is a fully hardware implemented function. Meanwhile, conventional filters using only hardware would require different types of hardware, such as capacitors and resistors, to be interchanged to manipulate different pulse signals entering the system.

When a pulse signal enters the filter 110, it first passes through a Schmitt trigger inverter 210 in order to sharpen the edges of low rise/fall time signals. The signal then passes into an exclusive OR gate 210 that looks at the current output state and last output state to determine if a transition has been made. Whenever the exclusive OR gate 210 detects a difference between the input pulse signal state and the currently accepted pulse signal state (the output of flip flop 250), the output of 210 goes to a high state. The high state is immediately transferred to one input of the exclusive OR gate 225. The high state is also transferred through a low pass filter comprised of elements resistor 215 and capacitor 220 into the second input of exclusive OR gate 225. This filter delays the high level output state from exclusive OR gate 210 slightly in time, so that exclusive OR gate 225 sees one input go high then slightly later in time the other input goes high. This causes the output of exclusive OR gate 225 to go high then back to low generating a narrow high going pulse. This pulse resets the one shot pulse signal 235, also known as a "blanking" pulse. Any difference in state between the input pulse and the accepted output state will reset this "blanking" pulse 235. The values of resistor 215 and capacitor 220 are chosen to generate a reset pulse 230 of sufficient width to be detected by the reset input circuit on the timer/counter 130 on the microcontroller 155.

After the pulse-in signal has been stable for the full one shot Pulse duration, the one shot pulse 235 will go low. The pulse signal 235 is transmitted back from the timer/counter 130 on the micro-controller 155 into another Schmitt trigger 240 to invert the signal The "blanking" pulse signal 235 is configurable by the application software for a set duration time from 50 uS to 6000 mS. This signal is then sent into the D flip-flop 250 which holds the signal stable for the blanking pulse duration time. Therefore, when the pulse duration is complete, the D flip-flop 250 will clock and a signal will be sent to the pulse accumulator 120 to be counted. Those skilled in the art will appreciate that other designs or elements for the software configurable hardware filter 110 are not beyond the scope of the invention. That is, fewer or more as well as different circuit elements such as AND, OR, and other logic gates could be substituted or added.

Figure 3:
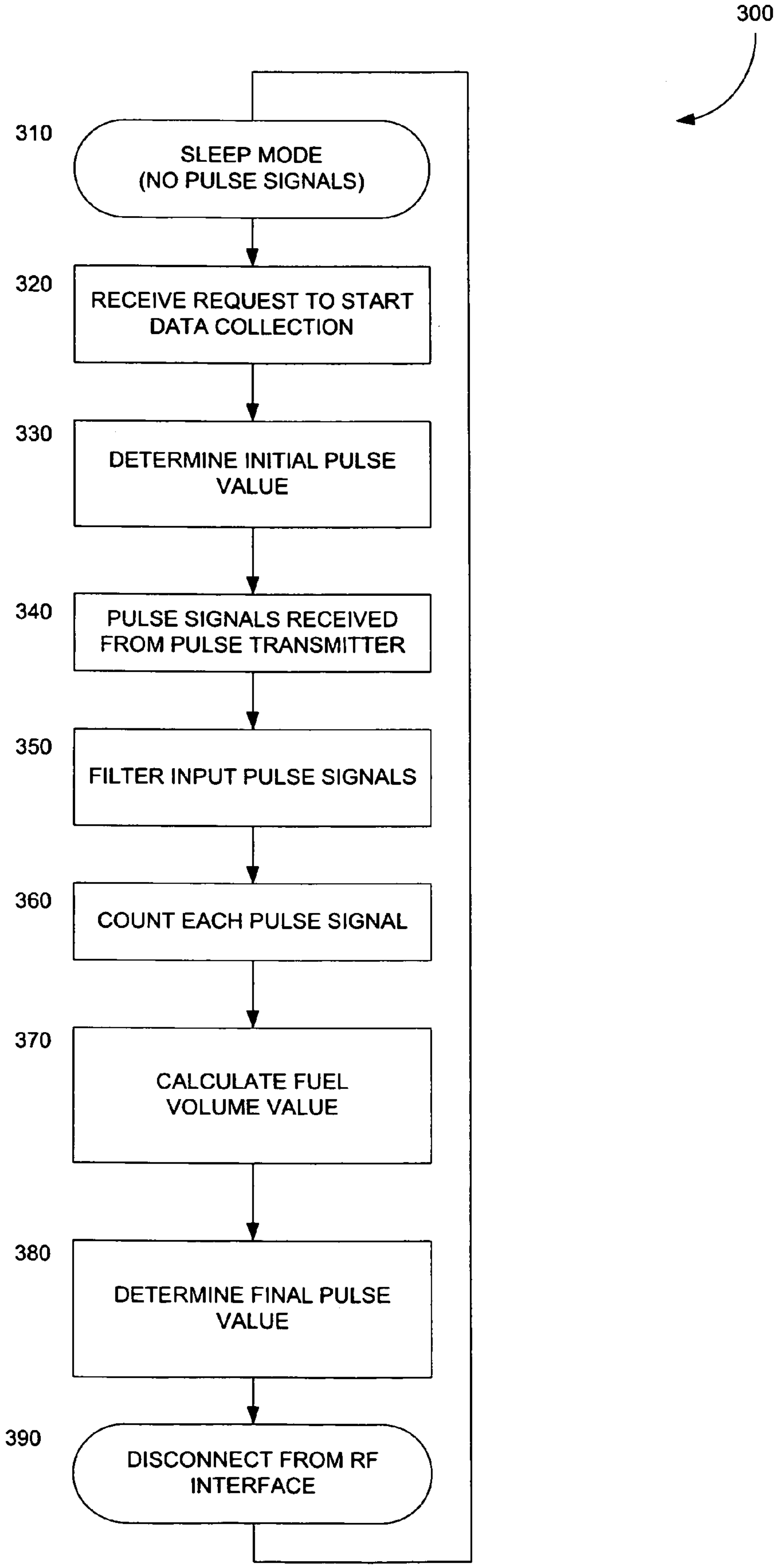
FIG. 3 is a flow chart depicting an exemplary method for receiving and counting input pulse signals in accordance with an exemplary embodiment of the invention.

Referring now to FIG. 3, this drawing is a flow chart depicting an exemplary method 300 for receiving and counting input pulse signals in accordance with an exemplary embodiment of the invention. In step 310, when the pulse transmitter 105 is not generating pulse signals and communication requests are not being made through the wireless module 175 or serial interface 160, the system 100 can operate in a low power sleep mode to conserve battery 140 power. In step 320, an operator sends a wireless request to the system 100 to begin collecting data. This request starts the application software that determines the initial pulse value in step 330 by reading the current pulse total on the pulse accumulator 120.

In step 340, the operator can begin pumping fuel into the aircraft and pulse signals are received by the system 100 from the pulse transmitter 105. In step 350, the software configurable hardware filters 110A, 110B provide additional band filtering on the input signals and are especially useful for removing extra noise from the input pulse signals caused by the vibration of contacts in mechanical switches. Next, the pulse signals are transmitted to the pulse accumulators 120 in step 360 where each signal increments a timer/counter register In step 370, the application software will continuously convert the input pulse values into a volumetric value by applying a meter factor that represents the amount of fuel equivalent to each pulse signal received. These values are stored in memory 190 until a request is made to retrieve them by an external device.

In step 380, after the operator stops fueling the airplane, the application software will determine the final pulse value by reading the current pulse total from memory 190. Finally, the total volume value of fuel will be transmitted wirelessly by the Bluetooth RF module 175 through the antenna 180 to the operator. The operator will then disconnect from the RF interface in step 390. After a certain period of time, configurable in the application software, the system 100 can return to the low power sleep mode.

Figure 4:
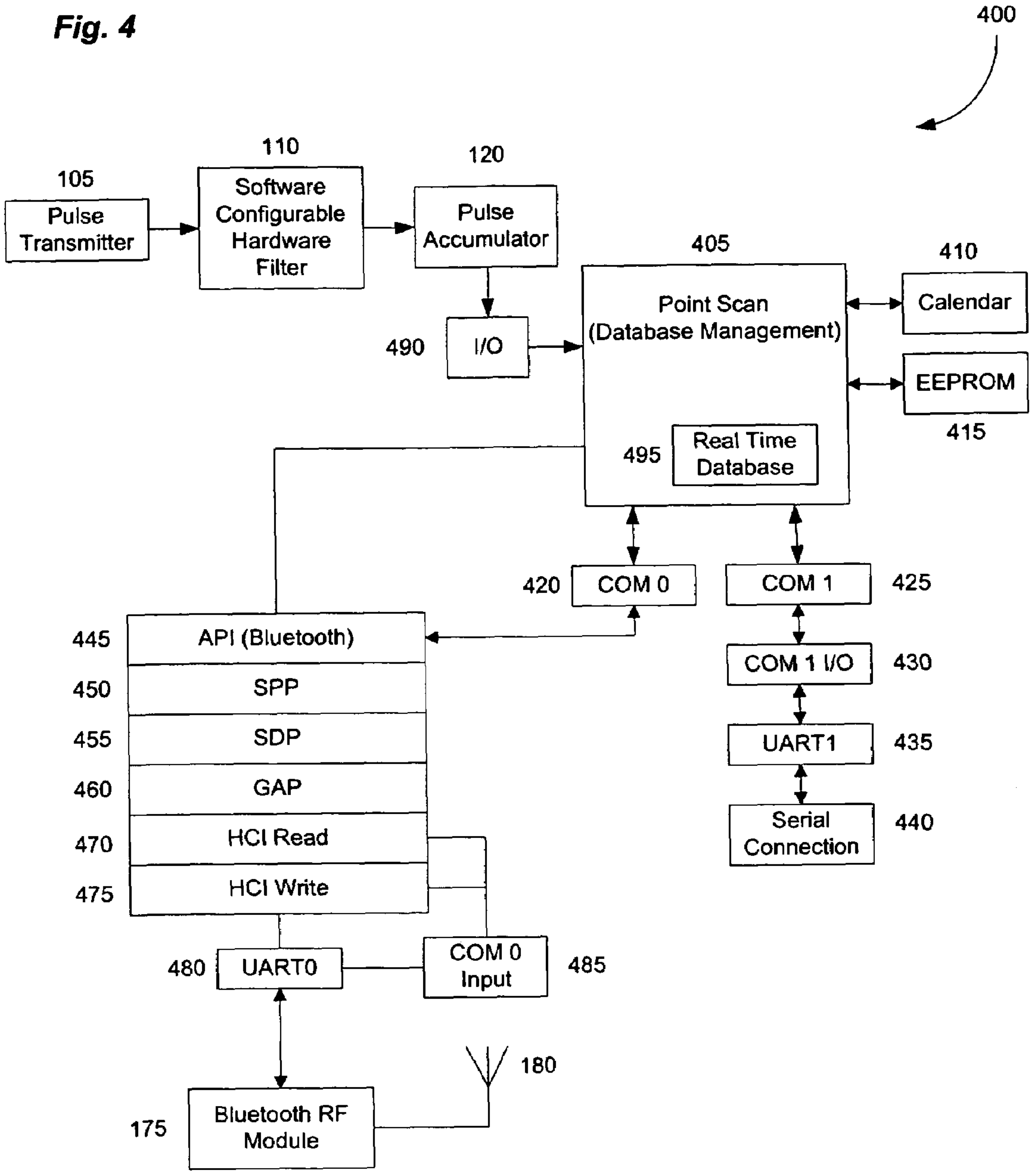
FIG. 4 is a software architecture/hardware diagram illustrating the software task functions in accordance with an exemplary embodiment of the invention.

Referring now to FIG. 4, this drawing presents a software architecture/hardware system 400 illustrating software task functions in accordance with an exemplary embodiment of the invention. The micro-controller based operating system is a real time multi-tasking kernel that can utilize software developed by other parties, such as the Real Time Executive in C (RTXC) system developed by Quadros Systems, Inc. Furthermore, the system relies on Bluetooth tasks developed by IAR. The operating system comprises of a multitude of static tasks.

When the pulse transmitter 105 is not generating pulse signals and communication requests are not being made through the Bluetooth RF module 175 the micro-controller 155 is in a low power sleep mode that conserves battery 140 power as shown in step 310 of FIG. 3. At the same time, the Bluetooth RF module 175 is in a low power receive only mode. In this mode, the Bluetooth RF module 175 is discoverable, meaning that an external Bluetooth device, such as a Bluetooth enabled PC or Handheld, can search and find the micro-controller 155 through a wireless connection.

If a Bluetooth device attempts to connect to the micro-controller 155, the Bluetooth RF module 175 will send a control signal to the micro-controller 155. This triggers a hardware interrupt, and the micro-controller 155 resumes execution of the application software as show in step 320 of FIG. 3. More specifically, the Bluetooth module 175 sends data to communications port UART0 480. The COM 0 Input task 485 receives data from communications port UART0 480 using interrupts and Direct Memory Access (DMA). The COM 0 input task 485 signals the HCI Read task 470. The HCI Read Task 470 identifies Service Discovery Protocol (SDP) data messages and sends data pointers and signals to the SDP task 455. The SDP task 455 provides a protocol layer capable of publishing to a Bluetooth Host the supported Bluetooth functionalities of the micro-controller and allows the device to be identified by a Host system searching for Bluetooth equipped devices. The SDP task 455 signals the HCI Write task 475 with discovery information. The HCI Write task 475 sends data packets to communications port UART0 480 which are transmitted by the Bluetooth RF Module 175. The Generic Access Profile (GAP) task 460 publishes at a host system a list of Bluetooth services available for transmitting and receiving data from the system 100 using a similar interaction with the HCI Write task 475. The only available service in the device is the serial port profile which creates a virtual serial port. The Host system must establish a connection using the Serial Port Profile (SPP) 450 service. The Serial Port Profile (SPP) task 450 provides an emulated virtual serial port over the Bluetooth interface. The SPP task 450 exposes to a high-level API 445 that the application program can use to transmit and receive data in a way that is very similar to a standard serial port.

Once a connection is established using the SPP service, the SPP task 450 assembles data packets and signals the API 445. The COM 0 Task 420 receives data pointers and events from the API 445. The HCI Read task 470 identifies data messages from COM0 input 485 as either SPP 450, SDP 455 or GAP 460 related and routes the messages to the appropriate tasks.

Once the micro-controller 155 is out of the low power sleep mode and executing the application tasks, typically the external Bluetooth connected Host device (i.e. Intoplane Client Handheld Computer) will send a command to request the current pulse meter total as shown in step 330 of FIG. 3. The request to transmit pulse data is passed through the RF Module 175, COM0 input 485, HCI Read 470, SPP 450, and API 445. The protocol handler in COM0 task 420 retrieves the data from the database 495. The totals in the database 495 are kept current by the I/O task 490. The protocol handler sends the data to the API 445 which, in turn, notifies SPP 450. SPP 450 sends the data to HCI Write 475 which, in turn, sends it to communications port UART0 480 for transmission to the host by the RF module 175.

After determining the initial pulse value as shown in step 330 of FIG. 3, a fueling transaction as shown in step 340 of FIG. 3 begins when an operator begins fueling an aircraft. Fuel flowing through a mechanical meter turns a shaft at a rate proportional to the volume of fuel moving through the meter. This moving shaft is connected to a pulse transmitter 105 that generates a pulse train. The number of pulses generated is also proportional to the volume of fuel pumped through the meter.

The pulse transmitter 105 is electrically connected to the micro-controller 155. The micro-controller incorporates a software configurable, hardware filter 110 which attenuates higher frequency noise on the pulse channel as shown in step 350 of FIG. 3. The filter is especially useful for removing extra noise from the input pulse signals caused by the vibration of contacts in mechanical switches. The filter 110 is programmable by software to allow different one shot pulse 235 durations. Once the desired duration is set during configuration of the device the value is written into a timer/counter register 130 and the hardware operates independently of the software. This duration value is also maintained in non-volatile memory 190 and is written to the timer/counter register 130 each time the units starts up.

After passing through the filter 110, the pulse signal enters an accumulator 120 which increments a timer/counter register 130 for each pulse received as shown in step 360 of FIG. 3. During this time, the I/O task 490 periodically updates data in the database 495. The I/O task 490 periodically reads the value of the accumulator register 120, adds contents to a variable, and resets the counter. If the accumulator register 120 overflows before the I/O task 490 reads the data, an interrupt occurs and the register value is preserved for the I/O task 490. The I/O task 490 sends the new pulse total to the Point Scan task 405.

As shown in step 370 of FIG. 3, the Point scan task 405 continuously applies a conversion called the meter factor, which is stored as a configuration parameter in the nonvolatile memory 190, to the pulse total to calculate a volumetric total. The meter factor represents the amount of fuel equivalent to each pulse signal received to the input pulse signal value read from the database. The volumetric total is written to the real-time database 495 as the meter total. These values are transmitted to a host device in steps 330 and 380 as shown in FIG. 3. Furthermore, a command can be sent for the system 100 to archive the current transaction, which stores the current totals as well as a time stamp. The Calendar task 410 manages the current system time and 410 creates the data for time stamping fueling transactions. The calendar task 410 increments the system time beginning at startup. Although the application software is not required to be in synchronization with actual time, a hardware real-time clock is available to maintain synchronization.

As shown in step 380 of FIG. 3, after the operator stops fueling the airplane, once again, the host sends a request to determine the final pulse value. The request to transmit pulse data is passed through the RF Module 175, COM0 input 485, HCI Read 470, SPP 450, and API 445. In turn, the protocol handler in COM0 task 420 retrieves the data from the database 495. The protocol handler sends the data to the API 445 which, in turn, notifies SPP 450. SPP 450 sends the data to HCI Write 475 which, in turn, sends it to communications port UART0 480 for transmission back to the host by the RF module 175. The Point Scan task 405 sends the current meter values and well as a time stamp to the EE task 415 for storage in the Electronically Erasable Programmable Read Only Memory (EEPROM). The EE task 415 controls access to the EEPROM for storing and retrieving configuration data.

After the final pulse value is converted into a volume total as shown in step 380 of FIG. 3 and transmitted wirelessly by the Bluetooth RF module 175 through the antenna 180 to the operator, the host device (i.e. the IntoPlane client handheld) can perform a differential calculation to calculate the total volume of fuel that has been pumped into the aircraft.

The Host device then terminates the Bluetooth connection as shown in step 390 of FIG. 3. The Bluetooth protocol stack signals the Point Scan task 405 that a disconnection has occurred. The Point Scan Task 405 signals the COM 0 task 420 to place the Bluetooth RF module 175 into a low power receive only mode. The Point Scan task 405 also signals for the micro-controller to enter a low power sleep mode.

When the micro-controller 155 does not process new pulse data or communication data for a certain period of time, the micro-controller 155 will automatically go back into low power sleep mode. This period of time is configurable by the application software and is usually set for 30 minutes.

Typically the pulse transmitter 105 is connected directly to a power source (i.e. Battery) 140, but the pulse transmitter 105 can also be powered 185 by the micro-controller 155. In this exemplary embodiment, the micro-controller 155 can be configured to place the pulse transmitter 105 in a low power state by turning off power to the pulse transmitter 105 during sleep mode. If this exemplary configuration is enabled, the Point Scan task 405 signals the I/O task 490 before the micro-controller 155 enters low power sleep mode, and the I/O task 490 turns off output power 185 to the pulse transmitter 105.

While the micro-controller 155 is in low power sleep mode, a state transition on either pulse channel will generate an interrupt and the micro-controller 155 will resume execution of the application program. This situation would occur if pumping fuel for a transaction was inadvertently started without using a Bluetooth connection process to wake up the micro-controller. This allows the micro-controller 155 to "wake up" and continue counting pulses. Although the meter start value would be lost for this transaction, the micro-controller pulse total can stay in synchronization with any mechanical counter that is mounted on the fueling cart. This feature supports periodic verification of the operation of the micro-controller. However, if the micro-controller 155 is used to control power 185 to the pulse transmitter 105 for power usage minimization, as explained above, this feature is not operable because the pulse transmitter 105 is powered down during low power sleep mode and is unable to generate the pulses needed to wake up the micro-controller 155.

About every 30 seconds the micro-controller 155 is signaled to "wake up" from low power sleep mode by a low frequency oscillator 165. The COM 0 task 420 will monitor the operation of the Bluetooth RF module 175 and determines the state of the Bluetooth protocol stack 445, 450, 455, 460, 470, 475. The I/O task 490 monitors the state of the hardware. If hardware or software error conditions are detected recovery processes will be initiated. If no errors are detected or all the error conditions are resolved, the Point Scan task 405 signals for the micro-controller 155 to re-enter a low power sleep mode.

Figure 5:
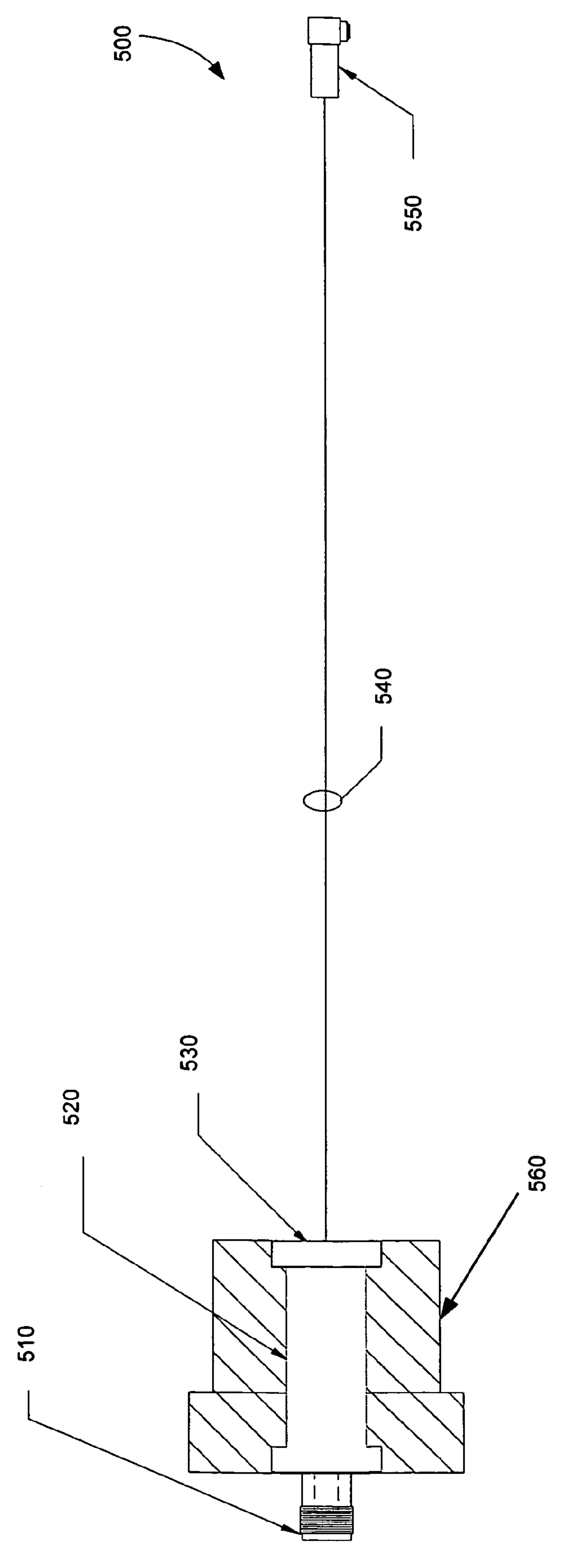
FIG. 5 is an illustration of a cross-sectional view of an antenna coupling in accordance with an exemplary embodiment of the invention.

Referring now to FIG. 5, this drawing is an illustration of a cross-sectional view of an antenna coupling 500 in accordance with an exemplary embodiment of the invention. This exemplary antenna coupling provides for the union of a wireless antenna 180 with an explosion proof enclosure 195. One exemplary operating environment of the invention calls for a highly rated enclosure 195 to prevent the ignition of fuel fumes by the electronics incorporated into the invention. The antenna 180 is connected to the enclosure 195 using a Sub-Miniature Type-A (SMA) jack 510. The antenna cable passes through a connector 560 forming a seal. The connector 560 has at least nine threads, which allows the expanding gases to cool down if fuel vapors penetrate the enclosure 195 and an ignition occurs. Therefore, while an explosion could occur in the enclosure 195, the enclosure 195 would be able to stay intact and dissipate the energy of the ignition. The connector 560 is filled with an epoxy resin 520 that surrounds the RF cable 540 that passes from the SMA jack 510 through the connector 560 and into the enclosure 195. An example of an epoxy resin 520 that can be used is Emerson & Cumming, Inc. Type STYCAST 2651-40 Black. Furthermore, an epoxy 530 is used to fill the area at the end of the connector 560 where an MMCX Plug 550 is connected to the connector 560. At the opposite end, the MMCX plug 550 connects to the Bluetooth RF module 175.

Figure 6:
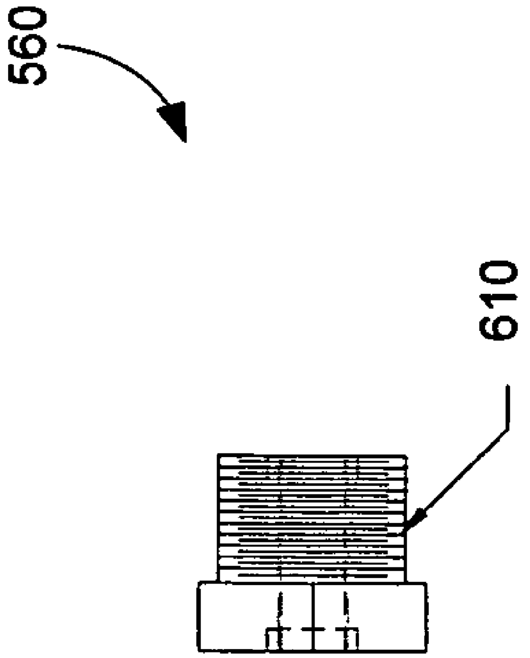
FIG. 6 is an illustration of a connector that is used in an antenna coupling in accordance with an exemplary embodiment of the invention.

Referring now to FIG. 6, this drawing is an illustration of a connector 560 shown in FIG. 5 without the SMA Jack 510 and RF cable 540 that is used in an antenna coupling 500 in accordance with an exemplary embodiment of the invention. One type of material the connector can be made from includes 1¼" Hex Aluminum Type 6061-T6. Furthermore, the barrel 610 is threaded external with ¾" National Pipe Thread (NPT). The inside bore of the coupling 500 is taped 10 mm ×65 to allow the epoxy resin compound 520 to lock in place.

It should be understood that the foregoing relates only to illustrative embodiments of the invention, and that numerous changes may be made therein without departing from the scope and spirit of the invention as defined by the following claims.

What is claimed is:

1. A data collection unit for a fuel management system, comprising:

a pulse transmitter that transmits pulse signals corresponding to a flow of fuel;

a configurable filter that attenuates the pulse signals received from the pulse transmitter;

a pulse accumulator that increments a counter for each input pulse signal;

a micro-controller that reads the pulse accumulator and calculates a volume of fuel based on the pulse signals; and an RF module coupled to the micro-controller for producing RF signals.

2. The data collection unit of claim 1, wherein the configurable filter is configured by a software module.

3. The data collection unit of claim 2, wherein the software module is executed by the micro-controller.

4. The data collection unit of claim 1, further comprising an antenna coupled to the RF module.

5. The data collection unit of claim 1, wherein the pulse transmitter produces signals proportional to a volume of fuel.

6. The data collection unit of claim 1, wherein the unit enters into a sleep mode to conserve power when the pulse transmitter does not transmit signals.

7. The data collection unit of claim 1, further comprising a power source that supplies input power to the micro-controller.

8. The data collection unit of claim 7, wherein the power source comprises a battery.

9. The data collection unit of claim 1, further comprising a voltage and current monitor.

10. The data collection unit of claim 1, further comprising a discontinuous voltage regulator.

11. The data collection unit of claim 1 wherein said micro-controller further comprises at least one of a serial interface connection, an expansion port, a non-volatile memory, and a low frequency oscillator.

12. A method for calculating a volume of pumped fuel, comprising:

receiving a request to monitor a volume of fuel being pumped;

receiving input pulse signals from a pulse transmitter;

filtering each input pulse signal to reduce noise;

tracking each input pulse signal;

determining a final input pulse value; and calculating a fuel volume based on the input pulse signals.

13. The method of claim 12, further comprising adjusting a configurable hardware filter.

14. The method of claim 12, further comprising configuring an adjustable hardware filter with a software module.

15. The method of claim 12, wherein tracking each pulse signal further comprises incrementing a pulse accumulator for each input pulse signal.

16. The method of claim 12, further comprising modulating RF signals with the fuel volume.

17. The method of claim 12, wherein calculating the fuel volume comprises:

multiplying an initial input pulse value and the final input pulse value by a meter factor, wherein said meter factor comprises a constant corresponding to an amount of fuel set equal to one pulse signal.

18. A data collection unit for a fuel management system, comprising:

a configurable hardware filter that attenuates signals;

a micro-controller that reads the pulse accumulator and calculates a volume of fuel based on signals from the filter;

an RF module coupled to the micro-controller for producing RF signals;

a housing for preventing explosions that encloses the filter, the micro-controller, the RF module; and an antenna coupled to the housing and to the RF module for propagating the RF signals.

19. The data collection unit of claim 18, further comprising an antenna coupler for connecting the antenna to the housing.

20. The data collection unit of claim 19, wherein the antenna coupler comprises a predetermined number of threads.

* * * * *